US010974843B2

(12) United States Patent
Chang et al.

(10) Patent No.: US 10,974,843 B2
(45) Date of Patent: Apr. 13, 2021

(54) HOT-SWAPPABLE HYBRID APU FOR AIRCRAFT

(71) Applicant: Textron Aviation Inc., Wichita, KS (US)

(72) Inventors: Vernon Weng-Yew Chang, Wichita, KS (US); Charles Bernard Beuning, Wichita, KS (US); August Bryce Ratzlaff, Wichita, KS (US); David Lee Swartzendruber, Valley Center, KS (US)

(73) Assignee: Textron Innovations, Inc., Providence, RI (US)

( * ) Notice: Subject to any disclaimer, the term of this patent is extended or adjusted under 35 U.S.C. 154(b) by 485 days.

(21) Appl. No.: 15/927,248

(22) Filed: Mar. 21, 2018

(65) Prior Publication Data

US 2018/0273198 A1 Sep. 27, 2018

Related U.S. Application Data

(60) Provisional application No. 62/474,310, filed on Mar. 21, 2017, provisional application No. 62/474,294, (Continued)

(51) Int. Cl.
*B64D 41/00* (2006.01)
*H02J 1/00* (2006.01)
(Continued)

(52) U.S. Cl.
CPC ............. *B64D 41/00* (2013.01); *B64D 13/06* (2013.01); *B64D 45/00* (2013.01); *B64F 5/40* (2017.01);
(Continued)

(58) Field of Classification Search
CPC ........ B64D 41/00; B64D 13/06; B64D 45/00; B64D 2013/0611; B64D 2041/002; B64D 2045/0085; B64D 2221/00; B64F 5/60; B64F 5/40; G01F 9/001; G05D 1/0011; G07C 5/008; H01M 2/1077; H01M 2/20; H01M 2/30; H01M 10/425; H01M 2010/4271; H01M 2220/20; H02J 1/00;
(Continued)

(56) References Cited

U.S. PATENT DOCUMENTS 6,624,533 B1 9/2003 Swanson et al.
6,912,453 B2 6/2005 Le Draoullec et al.
(Continued)

*Primary Examiner* — Rodney A Bonnette
(74) *Attorney, Agent, or Firm* — Erise IP, P.A.

(57) ABSTRACT

A distributed auxiliary-power-unit (APU) system for an aircraft includes one or more battery modules for storing electrical power, and a plurality of racks distributed throughout the aircraft for receiving the one or more battery modules to electrically connect with an electrical subsystem of the aircraft. A plurality of hot-swappable racks are adapted to receive the battery modules for electrically and communicatively coupling with the electrical subsystem and an integrated controller. A remote interface is communicatively coupled with the integrated controller for receiving user-input to direct electrical power from the battery modules to one or more subsystems of the aircraft. A number of battery modules installed is based on an amount of electrical power planned for a given flight of the aircraft.

19 Claims, 10 Drawing Sheets

Related U.S. Application Data filed on Mar. 21, 2017, provisional application No. 62/474,303, filed on Mar. 21, 2017.

(51) Int. Cl.

| | |
|---|---|
| *B64D 13/06* | (2006.01) |
| *H02J 7/00* | (2006.01) |
| *G05D 1/00* | (2006.01) |
| *H01M 2/10* | (2006.01) |
| *H02M 7/44* | (2006.01) |
| *H02J 7/14* | (2006.01) |
| *B64F 5/40* | (2017.01) |
| *H02J 1/10* | (2006.01) |
| *B64F 5/60* | (2017.01) |
| *B64D 45/00* | (2006.01) |
| *G01F 9/00* | (2006.01) |
| *G07C 5/00* | (2006.01) |
| *H01M 10/42* | (2006.01) |
| *H01M 2/30* | (2006.01) |
| *H01M 2/20* | (2006.01) |

(52) U.S. Cl.
CPC ............... *B64F 5/60* (2017.01); *G01F 9/001* (2013.01); *G05D 1/0011* (2013.01); *G07C 5/008* (2013.01); *H01M 2/1077* (2013.01); *H02J 1/00* (2013.01); *H02J 1/10* (2013.01); *H02J 7/007* (2013.01); *H02J 7/0063* (2013.01); *H02J 7/1423* (2013.01); *H02M 7/44* (2013.01); *B64D 2013/0611* (2013.01); *B64D 2041/002* (2013.01); *B64D 2045/0085* (2013.01); *B64D 2221/00* (2013.01); *H01M 2/20* (2013.01); *H01M 2/30* (2013.01); *H01M 10/425* (2013.01); *H01M 2010/4271* (2013.01); *H01M 2220/20* (2013.01); *Y02T 50/40* (2013.01); *Y02T 50/50* (2013.01)

(58) Field of Classification Search
CPC .. H02J 1/10; H02J 7/0063; H02J 7/007; H02J 7/0423; H02M 7/44; Y02T 50/40; Y02T 50/50

See application file for complete search history.

(56) References Cited

U.S. PATENT DOCUMENTS

| | | | |
|---|---|---|---|
| 7,983,809 B2 | 7/2011 | Kell et al. | |
| 8,061,650 B2 | 11/2011 | Nguyen et al. | |
| 8,657,227 B1 * | 2/2014 | Bayliss | B64D 13/00 244/58 |
| 8,694,235 B2 | 4/2014 | Eadie | |
| 2012/0198875 A1 | 8/2012 | Tate, Jr. et al. | |
| 2014/0032034 A1 * | 1/2014 | Raptopoulos | G05D 1/0088 701/25 |
| 2014/0210399 A1 | 7/2014 | Urschel et al. | |
| 2014/0287273 A1 | 9/2014 | Nguyen et al. | |
| 2016/0046158 A1 | 2/2016 | Keller et al. | |
| 2016/0204615 A1 | 7/2016 | Radun et al. | |
| 2016/0254576 A1 * | 9/2016 | Burns | H01M 10/486 429/61 |
| 2016/0276854 A1 * | 9/2016 | Lian | H02J 7/0026 |
| 2017/0279170 A1 * | 9/2017 | O'Hora | B60L 53/14 |
| 2018/0026465 A1 * | 1/2018 | Guerin | B64D 41/00 361/624 |
| 2018/0273197 A1 * | 9/2018 | Chang | H02M 7/44 |
| 2018/0273209 A1 * | 9/2018 | Chang | B64F 5/40 |
| 2018/0273211 A1 * | 9/2018 | Chang | H02J 7/1423 |

* cited by examiner

HOT-SWAPPABLE HYBRID APU FOR AIRCRAFT

CROSS-REFERENCE TO RELATED APPLICATIONS

This application claims the benefit of each of U.S. Provisional Application No. 62/474,294 entitled Expedited Preflight Readiness System for Aircraft and filed on Mar. 21, 2017; U.S. Provisional Application No. 62/474,303 entitled Hybrid Auxiliary Power Unit for Connected Aircraft and filed on Mar. 21, 2017; and, U.S. Provisional Application No. 62/474,310 entitled Hot-Swappable Hybrid APU for Aircraft and filed on Mar. 21, 2017. The entireties of each of the aforementioned applications are incorporated by reference herein.

BACKGROUND

1. Field

Embodiments of this disclosure relate generally to auxiliary power units (APUs), and more specifically to APUs and associated electrical systems for providing auxiliary power to an aircraft.

2. Description of the Related Art

Conventionally, a gas turbine APU located onboard an aircraft is fixed in place such that moving the APU is either impractical or difficult, requiring displacement of shrouding, inlet/exhaust ducting, and a firebox that are associated with the APU. Some prior art systems provide portable ground power sources.

U.S. Pat. No. 8,694,535 to Eadie discloses an aircraft load management system based on wireless communication with RFID emitter tags located on each piece of cargo with consideration of aircraft center-of-gravity.

U.S. Patent Publication 2014/0287273 to Nguyen et al. discloses a portable ground power source for starting aircraft that includes a rechargeable lithium-ion battery pack.

U.S. 2014/0210399 to Urschel et al. discloses a portable lithium ion cell battery assembly for providing ground power to an aircraft.

SUMMARY

In an embodiment, a distributed auxiliary-power-unit (APU) system for an aircraft is provided. The system includes one or more battery modules for storing electrical power, and a plurality of connectors distributed throughout the aircraft for receiving the one or more battery modules to electrically connect with an electrical subsystem of the aircraft. A number of battery modules installed is based on an amount of electrical power planned for a given flight of the aircraft.

In another embodiment, an auxiliary power system for an aircraft is provided. The system includes a plurality of battery modules electrically coupled with an electrical subsystem of the aircraft, and a connector for electrically connecting a first battery module from the plurality of battery modules into the auxiliary power system. The connector is adapted for hot-swapping such that a second battery module may be used to replace the first battery module via the connector without shutting down the electrical subsystem or powering down the first battery module prior to uninstalling.

In yet another embodiment, a remote monitoring system for a distributed auxiliary-power-unit (APU) is provided. The system includes one or more battery modules electrically and communicatively coupled with an integrated controller, a plurality of hot-swappable racks each adapted to receive one of the one or more battery modules for electrically and communicatively coupling with the integrated controller, and a remote interface communicatively coupled with the integrated controller for receiving user-input to direct electrical power from the one or more battery modules to one or more subsystems.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Conventional auxiliary power units (APUs) are not easily removed from an aircraft or relocated within an aircraft to meet mission-specific payload or center-of-gravity (CG) requirements. An ability to easily remove an aircraft APU is desired to increase payload availability; otherwise, the aircraft flies with the APU regardless of whether or not it is used for a specific mission, resulting in unnecessary weight onboard the aircraft. An ability to easily relocate an aircraft APU is desired to improve CG management. When a mission profile requires adjustment of the aircraft's CG, either payload (e.g., passengers or cargo) are relocated, or additional ballast may be added. Ballast reduces the aircraft's available payload without adding any other mission-specific value. Further, the ballast may need to be off-loaded for the next flight if the CG requirements differ.

For a conventional combustion-powered APU, removal or relocation of the APU within an aircraft includes cooling the APU, removing any aircraft shrouding, inlet/exhausting ducting, and a firebox. Electrical cables and fuel/oil plumbing lines must be disconnected and the plumbing lines are drained. The process is time consuming and must be performed by maintenance personnel, and the aircraft is not available for flight during this time. Thus, altering the location, weight, and power of conventional APUs is impractical.

Embodiments of the present disclosure provide an APU that is easily movable, such that a crew member is capable of removing or relocating the APU. Also, the APU is configured for quick and easy disconnecting and reconnecting. This way, maintenance personnel are not required, little or no aircraft downtime is needed, and for a particular flight the APU may be appropriately sized and positioned to best meet the power and CG requirements for that flight.

Figure 1:
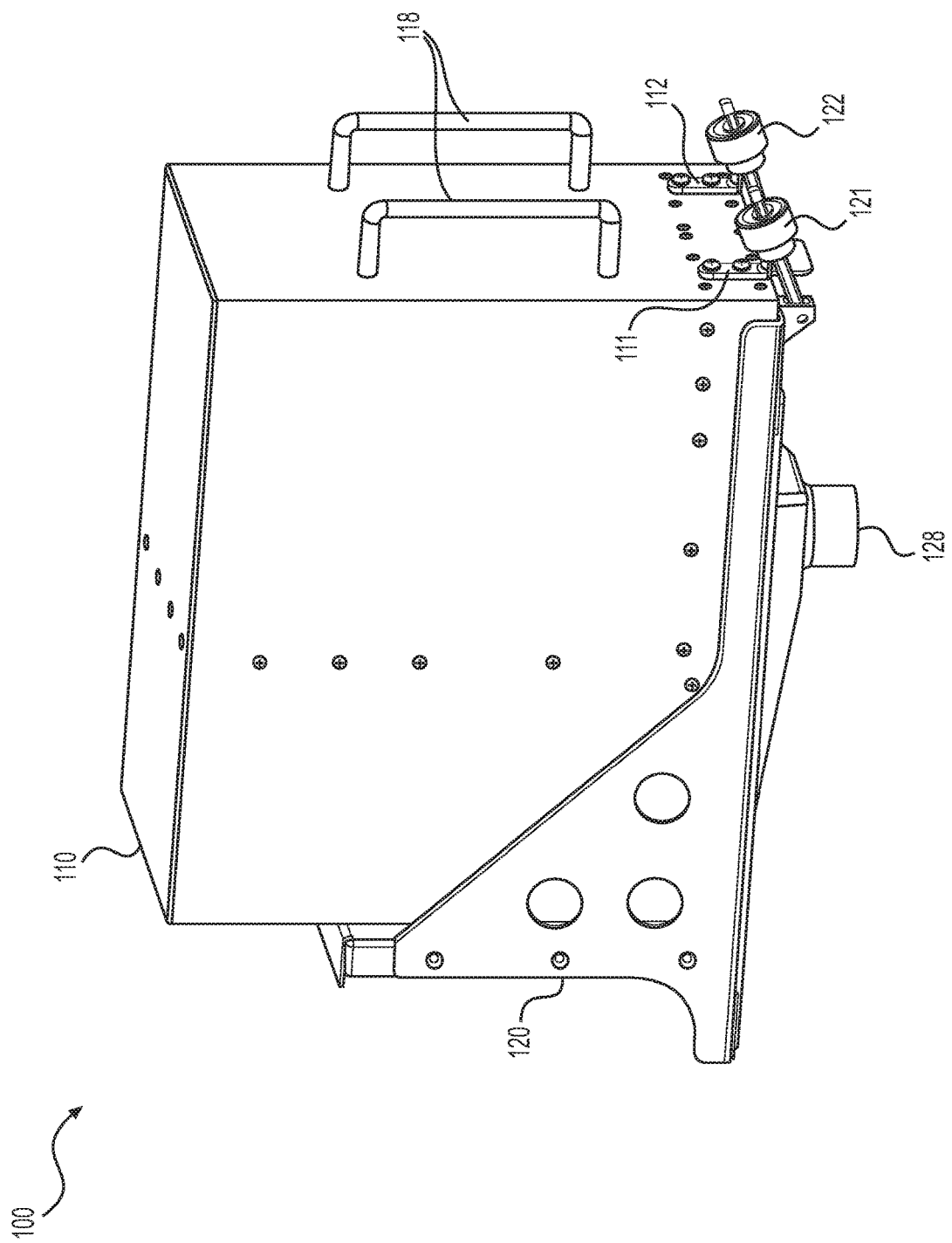
FIG. 1 shows a perspective view of a hot-swappable hybrid APU for aircraft, in an embodiment.

FIG. 1 shows a perspective view of a hot-swappable hybrid APU 100 for aircraft. Hybrid APU 100 includes a rack 120 configured for receiving a battery module 110. Rack 120 may in certain embodiments be any electrical connection, such as an electrical receptacle or electrical connector, configured for receiving battery module 110. Battery module 110 may include one or more internally located rechargeable batteries, such as a parallel arrangement of rechargeable batteries. Rack 120 may be installed in one or more flight-crew accessible locations of an aircraft, as further described below in connection with FIGS. 8-10. Battery module 110 is equipped with handles 118 and has a size and weight acceptable for an individual to easily install in, and uninstall from, rack 120 without the aid of tools or other equipment. Rack 120 may include a mechanism for securing battery module 110 thereto by hand. For example, a pair of hold downs 121, 122 are configured for turning by hand to tighten onto a matching pair of hooks 111, 112 mounted to battery module 110.

In embodiments, removal of battery module 110 is further simplified by a "hot swap" capability. The terms "hot swap" or "hot swappable" as used herein refer to an ability to plug and unplug battery module 110 in and out of rack 120 without shutting down the aircraft electrical subsystem or powering down the battery module 110 before installing/uninstalling. This enables battery module 110 to be mounted or unmounted while its batteries are charging or discharging. Hot swapping of battery module 110 is further described below in connection with FIGS. 2 and 3. Once removed from rack 120, battery module 110 may include electronics to monitor battery status, and the battery may remain in a low-power mode or may be completely turned off to enable extended-duration storage.

Battery module 110 may include electrochemical cells, bus bars, heat transfer media, insulation, sensors, protection circuitry, power and signal connectors, and a container with venting provisions. Critical sensors inside module 110, for cell-voltage sensing, current sensing, and temperature sensing, may be located adjacent to the cells. Rack 120 may include a vent 128 configured for venting heat from battery module 110 to the aircraft skin, for example. Combinations of monitoring, cell management/balancing, and protection circuitry may be placed in module 110 and/or rack 120. Protection circuits may be located inside module 110 (e.g., either collocated with the cells or in an isolated partition) or installed outside the module (e.g., in rack 120 or elsewhere in the aircraft).

For each battery module 110 and rack 120 mounted together, active and passive protection circuits prevent the cells from overheating, overcharging, over-discharging, or from having an overvoltage, under-voltage, cell-voltage imbalance, or overcurrent state. Active protection circuits may consist of electronic switches, relays, metal-oxide semiconductor field-effect transistors (MOSFETs), or similar electronically-activated current-interrupt devices. Passive protection circuits may consist of diodes, thermal fuses, high-current fusible links, or similar physically-activated current-interrupt devices.

Electrochemical cells within battery module 110 may be charged via a bulk charge process that conducts a large magnitude electrical current (e.g., on the order of amps) through power terminals (e.g., for an 8-cell series, a negative terminal is common to a first-cell negative, and a positive terminal is common to an eighth-cell positive). Alternatively, a top/trickle/cell-balance charge may be used to conduct small magnitude of electrical current (e.g., on the order of milli-amps) through each cell's power terminals (e.g., for an 8-cell series, through the negative and positive terminal of each cell). A combination of current interrupt devices may be used for bulk charge and top/trickle/cell-balance charge circuits. Cell voltage comparators may be used between adjacent cells or all cells to identify which top/trickle/cell-balance charge circuits to interrupt for optimal cell-voltage balancing.

Figure 2:
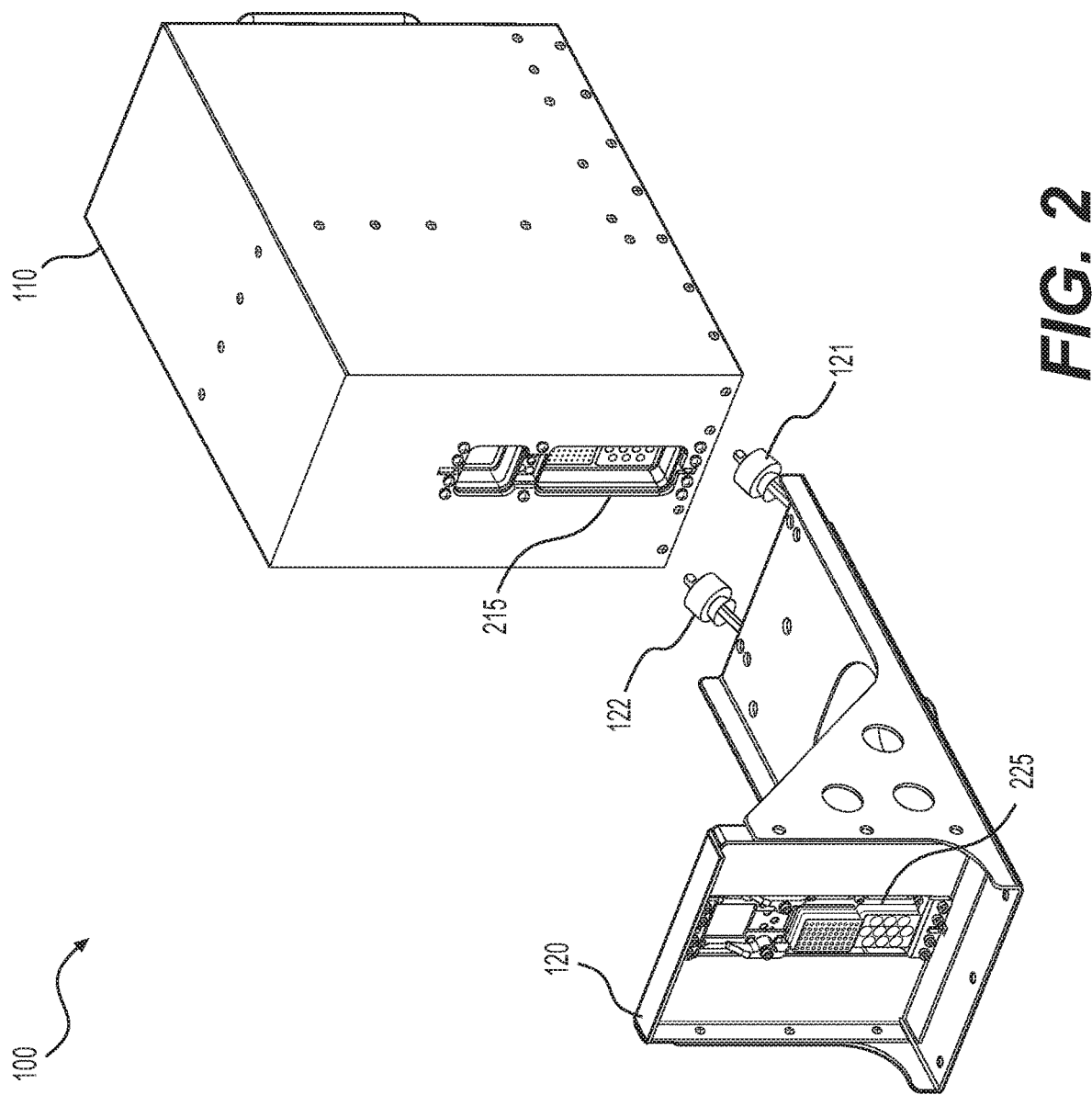
FIG. 2 shows a perspective view of the hybrid APU of FIG. 1 with a battery module removed from a rack.
Figure 3:
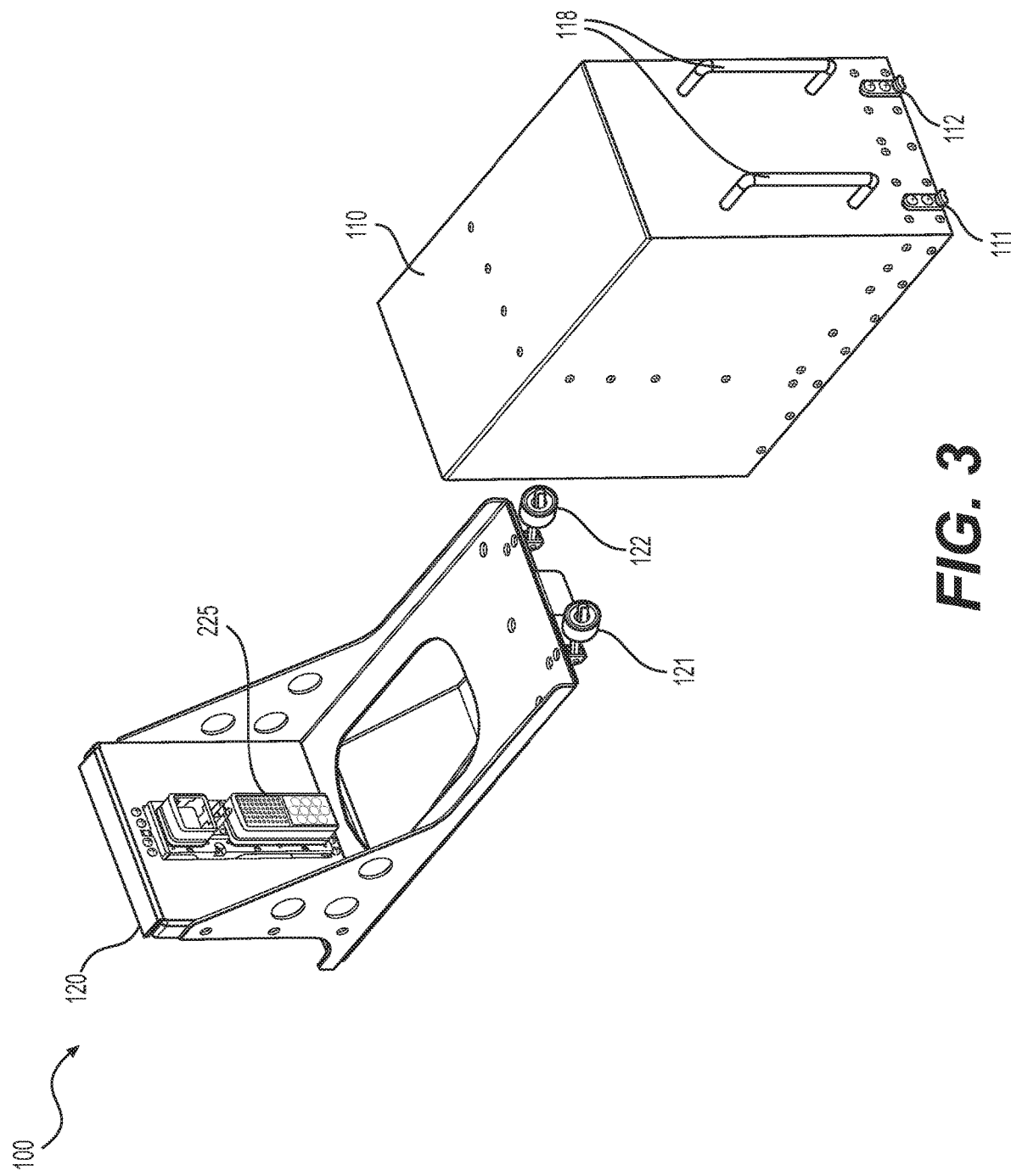
FIG. 3 shows a rotated perspective view of the hybrid APU and rack of FIG. 2.

FIG. 2 shows a perspective view of hybrid APU 100 with battery module 110 removed from rack 120. FIG. 3 shows another perspective view of hybrid APU 100, rotated ninety degrees from the view of FIG. 2. FIGS. 2 and 3 are best viewed together with the following description. Battery module 110 may include a receptacle 215 for electrically connecting with a connector 225 of rack 120. The electrical connection between receptacle 215 and connector 225 may include a combination of large-diameter, high-current pins/sockets (e.g., for bulk charging and discharge), medium-diameter, medium-current pins/sockets (e.g., for top/trickle/cell-balance charging), and small-diameter, low-current pins/sockets (e.g., for signal communication). In an embodiment, the large-diameter, high-current pins/sockets for conducting main electrical power are longer to provide a first-mate connection when mounting battery module 110 in rack 120 and a last-break connection when dismounting. Meanwhile, the small-diameter, low-current pins/sockets for signal communication are shorter such that they provide a last-mate connection when mounting and a first-break connection when dismounting. An example of connector 225 is an ARINC 600 connector.

In operation, when receptacle 215 connects with connector 225, a signal is transmitted (e.g., from integrated controller 1) via the shorter signal pins/sockets, which activates a relay to close within battery module 110 to allow flow of electrical power, thereby preventing arcing between the high current pins/sockets of the receptacle 215 and connector 225 during mounting of battery module within rack 120. Whenever signal pins/sockets are disconnected, the internal relay of battery module 110 automatically opens to stop electrical current, then the longer, high-current pins/sockets are last to disconnect. Since no electrical current is flowing, no arcing occurs during unmounting. The relay is, for example, a bi-stable (e.g., latching) relay that receives a pulse of energy to its coil to change its contact position between a closed relay and an open relay. Without power, the closed (e.g., "conduct") and open modes of the relay are maintained.

In certain embodiments, hybrid APU 100 may include a plurality of battery modules 110 that may be mounted to a respective plurality of racks 120 located in various installation locations of the aircraft (e.g., in a nose compartment, fairing, tailcone, or stinger), as described below in connection with FIGS. 8-10. Battery modules 110 may be mounted or unmounted without tools by the flight crew and without the need for a mechanic or maintenance down-time, providing versatility for adjusting the number (based on mission electrical requirements) and location (based on CG requirements) of battery modules 110. Battery modules 110 may be mounted behind lockable doors for security. An exemplary electrical architecture, described below in connection with FIG. 4, is configured for a plurality of battery modules 110 to function as a single, cohesive battery, and for battery modules 110 to be hot-swappable while charging or discharging without needing to shutdown APU 100.

Figure 4:
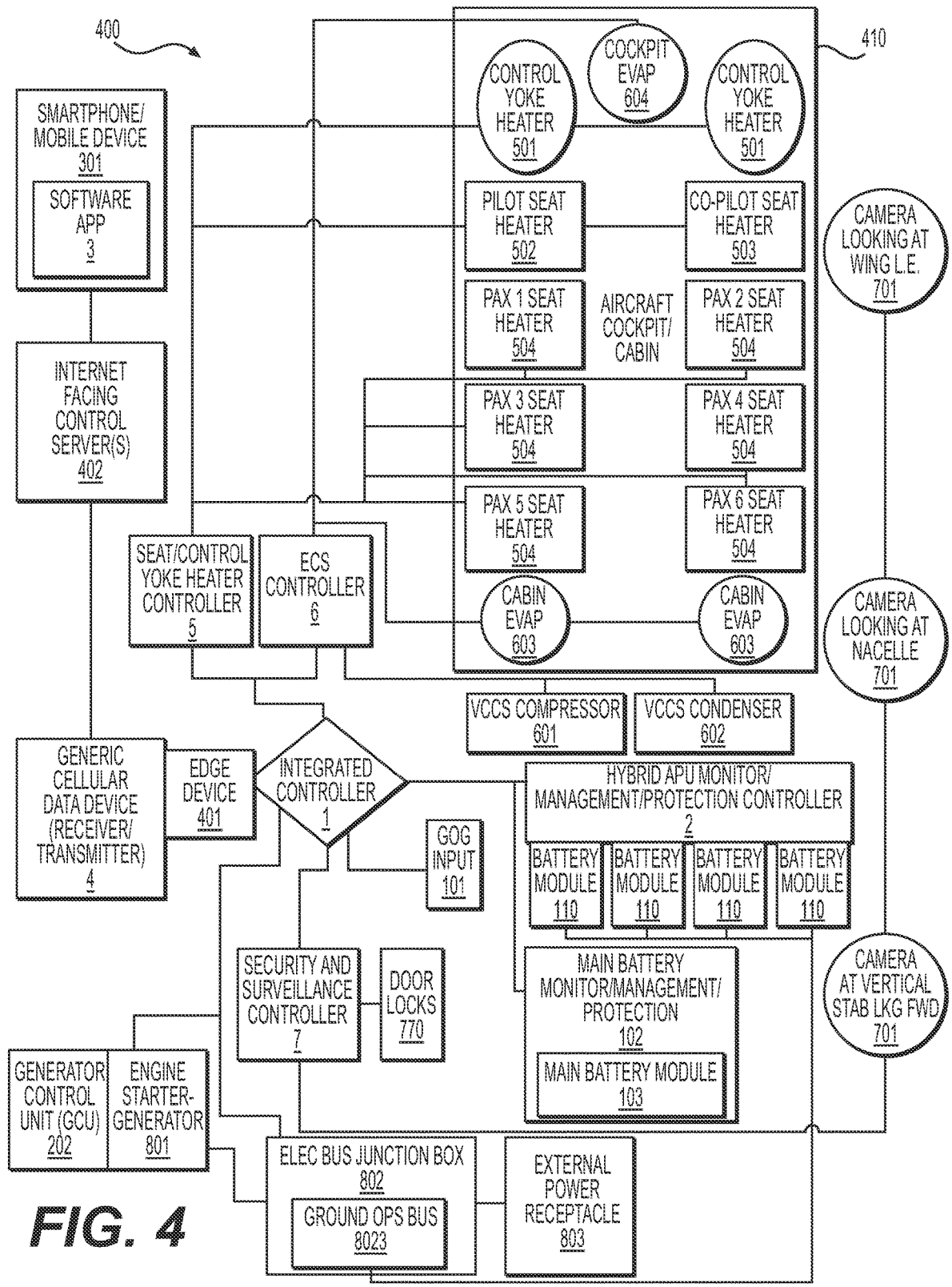
FIG. 4 is a block diagram representing an exemplary electrical architecture for preflight readiness of an aircraft, having a hybrid APU, in an embodiment.

FIG. 4 is a block diagram representing an exemplary electrical architecture 400 for preflight readiness of an aircraft having a hybrid auxiliary power unit (APU) 2. Electrical architecture 400 enables the flight crew to begin preflight preparation of an aircraft before arriving at the airport. Hybrid APU 2 is an example of hot-swappable hybrid APU 100, FIGS. 1-3 configured for providing electrical power for distribution to aircraft subsystems via architecture 400. Electrical architecture 400 may alternatively be powered by ground power provided by an airport via external power receptacle 803 or by an electrical generator powered by aircraft engines 801; hybrid APU 2 provides advantages over alternative options. For example, hybrid APU 2 advantageously enables the flight crew to remotely monitor and start multiple aircraft subsystems for preflight readiness via a mobile device 301 while the aircraft is unattended on the ground. Mobile device 301 may be any remote user-interface device, without departing from the scope hereof, include a computer, laptop computer, tablet, smartphone, smart watch, etc.).

Preflight readiness activities powered via hybrid APU 2 and controlled remotely via mobile device 301 may include preforming preflight checks (e.g., checking engine oil level, tire pressure, fuel quantity, and electrical subsystem state-of-charge) and preconditioning the aircraft cockpit and cabin (e.g., preheating or precooling). The aircraft cockpit and cabin 410 include a control-yoke heater 501 and a pilot seat heater 502 for both the pilot and co-pilot (if applicable), as well as a plurality of passenger (PAX) seat heaters 504. Seat/yoke heater controller 5 is used to control heating of control-yoke heater 501, pilot seat heater 502, co-pilot seat heater 503, and passenger seat heaters 504. Seat/yoke heater controller 5 may include a PCB, a microcontroller, a microprocessor, or a PLC, for example. Additional electric heaters (not shown) may also be controlled by heater controller 5, such as heaters for cockpit/cabin air preheating, windshield-defrost, engine oil preheating, battery preheating, and wing leading-edge anti-icing/deicing, for example. Conventional aircraft typically use hot bleed air from an engine or a gas-turbine APU to provide cockpit/cabin air heating, requiring ground personnel to be present when combustion devices are in use. Heaters 501, 502, 503, and 504, as well as additional electric heaters (not shown), may be remotely controlled via mobile device 301.

An environmental control subsystem (ECS) controller 6 includes a controller for controlling air conditioning to the aircraft cockpit and cabin 410 for precooling. ECS controller 6 may be used to control a vapor cycle cooling subsystem (VCCS), including a refrigerant compressor 601, a refrigerant condenser 602, at least one cabin evaporator 603, and a cockpit evaporator 604. In an embodiment, compressor 601 includes an electrically-powered, variable-speed compressor motor. ECS controller 6 may include a PCB, a microcontroller, a microprocessor, or a PLC, for example. Alternatively, ECS controller 6 may be incorporated within integrated controller 1. Cockpit and cabin temperature may be remotely controlled via mobile device 301. Cabin and cockpit evaporator fans 603, 604 may be independently switched on/off, either from cockpit/cabin switches, or remotely via mobile device 301.

A security and surveillance controller 7 provides control over door locks 710 and surveillance cameras 701, which may include a plurality of cameras such as a camera located on the vertical stabilizer looking forward, a camera located on a left and right wingtip looking respectively at a left and right nacelle, and a camera looking at a wing leading edge. Live views from the cameras may be displayed remotely via mobile device 301 (e.g., via security and surveillance button 604, FIG. 6). Door locks 710 may include door lock actuators and door lock position monitors, for example, which may be monitored and controlled via mobile device 301. Door locks 710 and cameras 701 enable a user via mobile device 301 to remotely unlock the aircraft for allowing entry of ground personnel and remotely view activity at the aircraft, respectively.

Electrical architecture 400 may be configured to power additional subsystems and monitoring devices not depicted in FIG. 4. For example, an avionics suite may be powered while the aircraft is on the ground for performing preflight checks, a fuel system monitor may include a fuel quantity indicator, and an engine system monitor may include several sensors such as an engine-oil-quantity indicator, all of which may be communicatively coupled with integrated controller 1.

Figure 5:
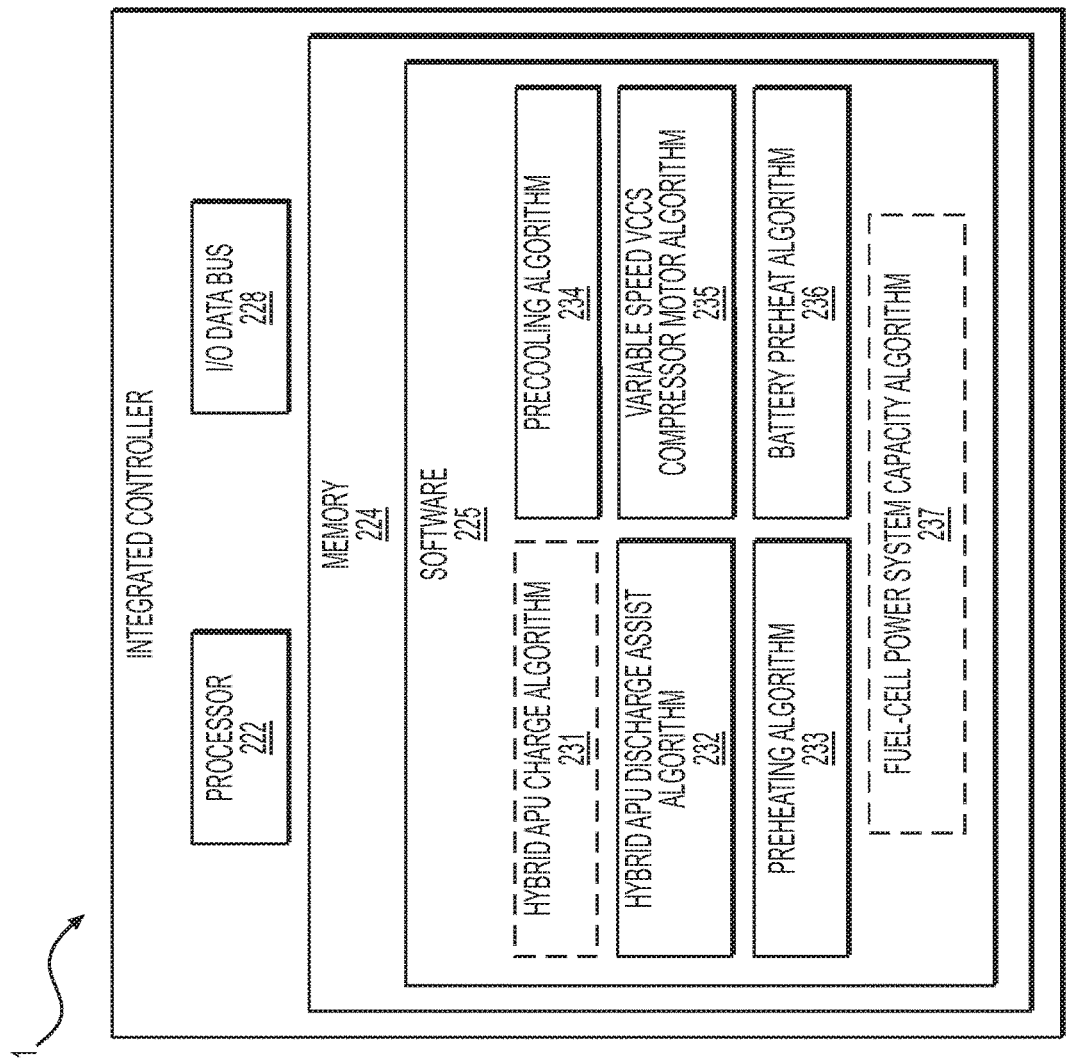
FIG. 5 is a block diagram of an integrated controller for controlling the electrical architecture of FIG. 4, in an embodiment.

FIG. 5 is a block diagram further illustrating integrated controller 1, FIG. 4. Integrated controller 1 may be one or more of a printed circuit board (PCB), a computer, a microcontroller, a microprocessor, or a programmable logic controller (PLC). Integrated controller 1 includes a memory 524, including a non-transitory medium for storing software 525, and a processor 522 for executing machine readable instructions of software 525. Memory 524 in some embodiments is a memory system that includes both transitory memory such as RAM and non-transitory memory such as, ROM, EEPROM, Flash-EEPROM, magnetic media including disk drives, and optical media. Software 525 may include look-up tables, formulas, and logical algorithms, such as algorithms 231-237, described below.

Integrated controller 1 further includes a multi-channel input/output (I/O) data bus 528 for communicating with a gear on ground (GOG) input 101, a main battery controller 102, hybrid APU 2, heater controller 5, ECS controller 6, and security and surveillance controller 7, FIG. 4. Note that some or all functions of seat/yoke heater controller 5, ECS controller 6, and a security and surveillance controller 7 may instead be performed by integrated controller 1. Integrated controller 1 is communicatively coupled via a wired and/or wireless communication device to a plurality of devices and subsystems, as described below in connection with FIG. 7. While awaiting commands from mobile device 301, integrated controller 1 may remain in a low power standby mode.

Returning to FIG. 4, mobile device 301 includes a memory (which is an example of memory 124, FIG. 4), including a non-transitory medium for storing software, and a processor for executing machine readable instructions of software. An interface enables a user to input instructions and view data, as further described below in connection with FIG. 6. Mobile device 301 includes a transmitter/receiver for communicating with integrated controller 1 via an internet facing control server 402, a generic cellular data device 4, and an Gateway device, which are described below in connection with FIG. 7. Note that lines connecting blocks in FIG. 4 may represent communicative coupling for data/signal transmission and/or electrical coupling for providing electrical power, or both.

Hybrid APU 2, which is communicatively coupled to integrated controller 1, includes a plurality of battery modules 110, FIG. 1 for storing and providing electrical power and circuitry configured for battery monitoring and protection. Battery modules 110, which are removably mounted to a respective rack 120, may include one or more of Nickel-Cadmium batteries, Lead-Acid batteries, and Lithium-Ion batteries, for example. Battery modules 110 may include batteries in a parallel arrangement (e.g., a bank of battery modules) and are configured to provide sufficient capacity to power integrated controller 1 and a communication subsystem (see e.g., FIG. 7), either continuously or intermittently, for an extended duration of aircraft inactivity. Status of battery modules 110 may be viewed remotely via mobile device 301, as described below in connection with FIG. 6. Intelligent algorithms 231-237, FIG. 5 may be used to efficiently manage energy usage by the APU, as further described below.

An advantage provided by using hybrid APU 2 is that aircraft subsystems may be operated when ground power is unavailable while still avoiding running of the aircraft engines. Running the aircraft engines or using a gas-turbine APU, each require ground personnel to be present and produce noise and air pollution that may be regulated by the airport. Running the VCCS with a Hybrid APU 2 may be between fifteen and thirty decibels (dBa) quieter than running a VCCS with a gas turbine engine or APU. Since hybrid APU 2 is not a combustion device, personnel do not need to be present for safe start-up or operation. Another advantage of hybrid APU 2 is that it provides non-essential power for responding to incoming status requests and commands from mobile device 301, which increases the connectivity of the aircraft. In other words, an aircraft equipped with hybrid APU 2 reliably has sufficient power for connecting to and operating aircraft subsystems remotely. Also, main aircraft batteries are required to be fully charged for take-off, so these are not available for preflight tasks without delaying departure.

The electrical junction box 802 is the core of the aircraft electrical distribution subsystem and may receive electrical power from various electrical power sources (e.g., an engine starter-generator 801, an external power cart, and a main battery module 103) and distributes electrical power to other aircraft subsystems (e.g., Avionics, Flight Controls, Environment Control Subsystem, Heater Control Subsystem, Security/Surveillance Subsystem, etc.). Hybrid APU 2 may be electrically coupled with the aircraft's subsystems, through electrical junction box 802. A ground operations bus 8023 inside the electrical junction box 802 may be used to electrically couple the Hybrid APU 2 to a select group of aircraft subsystems for unattended ground operations.

Main battery module 103 may be electrically coupled to the electrical bus junction box 802. The main battery module 103 is monitored, managed, and protected via main battery controller 102. Status of main battery module 103 may be remotely viewed via mobile device 301, as described below in connection with FIG. 6. Hybrid APU 2 and main battery controller 102 are subsystem controllers that may be monitored via integrated controller 1. Electrical bus junction box controller 802 may further include an emergency bus 8022. An external power receptacle 803 and engine starter generator 801 may also be electrically coupled to electrical bus junction box 802.

Hybrid APU 2 includes a plurality of battery modules 110 that may be discharged partially or completely during use. Through bus bars and relays in the electrical junction box 802, battery modules 110 may be configured either in series or parallel, depending on the aircraft utilization requirement. This provides a benefit to aircraft in situations (e.g., engine start) that require a higher voltage (e.g., for higher torque), while other situations (e.g., preflight readiness operations or emergency in-flight power) require the nominal voltage.

Engine starter-generator 801, under control of a generator control unit (GCU) 202, may be used to recharge battery modules 110 via ground operations bus 8023. Note that only one engine starter-generator 801 and one generator control unit 202 are shown in FIG. 4; however, more than one may be included system 400 (e.g., one engine starter-generator 801 and one generator control unit 202 per engine). Generator control unit 202, which provides charge control function for hybrid APU 2, may be a variable voltage generator control unit. When the engine starter-generator 801 is on-line, battery modules 110 and main battery module 103 may become high-current demanding loads if they are also on-line. To prevent excessive current draw, the generator control unit 202 may gradually step up the charge voltage for Hybrid APU charge control function. The gradual step up in charge voltage may be controlled from the integrated controller 1 and/or generator control unit 202. When the charge voltage is gradually stepped up, the impedance of battery modules 110 and main battery module 103 limits the charge current by the I=V/R relationship. The regulated voltage output from the engine starter-generator 801 may be gradually increased while maintaining a maximum current output that does not cause excessive heating or damage to the engine starter-generator 801. Gradual escalation of the charge voltage may be performed using generator control unit 202.

Since the hybrid APU 2 may be connected to electrical bus junction box 802 through the ground operations bus 8023, stored electrical energy from the Hybrid APU 2 may be used to recharge main battery 103.

The cells in each battery module 110 may be internally configured in a unique combination of series and parallel arrangements to achieve a particular nominal voltage and capacity rating for the battery module. For various electrical bus subsystems of different aircraft (e.g., 12 VDC, 28 VDC, 115 VAC, 270 VDC, or 350 VDC), hybrid APU 2 may be configured accordingly. Battery modules 110 of an individual nominal voltage and capacity may be collectively configured to provide a total nominal voltage and total capacity by arranging battery modules 110 in a combination of series and parallel arrangements to match the intended utilization scenario for each aircraft. This arrangement to achieve a higher total nominal voltage and total capacity may be achieved statically, by using unchangeable installed wiring and bus bars, or dynamically, by using relays and similar devices to change the total nominal voltage and capacity of the Hybrid APU 2 for a specified utilization scenario. One example is when the Hybrid APU 2 is used for normal unattended ground operations, the Hybrid APU 2 is at a nominal voltage matching the voltage of the aircraft electrical subsystem; however, if a higher voltage is needed for a particular use scenario such as starting an engine or recharging a lower voltage device, relays in the electrical junction box 802 may be actuated to achieve the required total nominal voltage.

Using algorithms 231-237, FIG. 5, integrated controller 1 may monitor a state of electrical charge, or more commonly referred to as state-of-charge (SOC), from its available power sources and centrally coordinate the initiation and operation of selected aircraft subsystems to minimize energy waste, while meeting preflight readiness requirements. In addition to being used for preflight readiness, monitored aircraft subsystem data may be used for trend monitoring and predictive servicing.

A hybrid APU charge algorithm 231 evaluates the SOC of hybrid APU 2 and determines the charge voltage necessary for timely charging of battery modules 110 without excessive loading on engine starter-generator 801. Algorithm 231 is optionally located within integrated controller 1 but may instead be part of generator control unit (GCU) 202. Algorithm 231 is used to regulate output voltage during charging of battery module 110 to prevent excessive current and the resulting temperature increase from the engine starter-generator 801 on the ground or in-flight.

A hybrid APU discharge assist algorithm 532 may be used continuously during ground and flight operations. During ground operations, algorithm 532 determines when main battery module 103 is depleted and instructs hybrid APU 2 to recharge main battery module 103, alleviating the need for recharge via a ground power cart or engine-starter generator 801 (which would require running the aircraft's engines). During flight when the flight crew instructs hybrid APU 2 to electrically connect with electrical bus junction box 802, hybrid APU 2 may provide electrical current to reduce engine starter-generator 801 load, and thus engine load, during critical flight stages such as take-off. During an in-flight emergency or unexpected loss of an electrical power source, hybrid APU 2 may provide additional emergency electrical power.

A preheating algorithm 533 is used during cold weather to preheat the cabin and/or cockpit. Preheating algorithm 533 may be activated by the flight crew via a command from mobile device 301 to integrated controller 1 with one or more target temperatures and a completion time. Individual target temperatures may be selected for control yoke heaters 501, pilot seat heaters 502, and passenger seat heaters 504. A windshield defrost completion time and temperature may also be selected. Preheating algorithm 533 evaluates the available charge capacity of hybrid APU 2, the outside air temperature (OAT), and the cockpit/cabin temperature against a look-up table or formula to determine the amount of time, operating profile of the heater systems, and the time needed for optimal just-in-time achievement of the preheating target temperature and time. In an embodiment, electric heaters provide only a fraction of the heat needed to fully heat the cockpit/cabin for reducing the cold weather experience, albeit without complete warmth. Preheating seats and the control yoke provides warmth even if the air remains cold.

A precooling algorithm 534 is used during hot weather to precool the cabin and/or cockpit. Precooling algorithm 534 may be activated by the flight crew via a command from mobile device 301 to integrated controller 1 with a target temperature and completion time. Precooling algorithm 534 evaluates the available charge capacity of hybrid APU 2, the OAT, and the cockpit/cabin temperature against a look-up table or formula to determine the amount of time, operating profile of the air conditioning system (e.g., ECS controller 6), and the time needed for optimal just-in-time achievement of the target temperature and completion time. Precooling algorithm 534 avoids achieving the target temperature substantially before the target completion time, which may cause excess energy loss from continuously running the air conditioner to compensate for heat load into the cabin.

A variable-speed VCCS compressor motor algorithm 535 uses a VCCS motor of compressor 601 to determine an operating profile for optimizing energy use, which reduces energy waste from running the compressor motor at full speed when only a minimal heat load exists.

A battery preheat algorithm 536 controls power-source discharge to preheat main battery module 103 and/or battery modules 110 until a predetermined temperature is achieved. Algorithm 536 may control heaters external to the battery or heaters internal to the battery.

For algorithms directed to a preconditioning operation (e.g., preheating 533, precooling 534, variable-speed VCCS compressor motor 535, and battery preheat 536), energy optimization includes determining the times for the appropriate subsystem to start-up, operate, and shutdown. In a scenario where insufficient energy is available for achieving the target times, the flight crew is notified via mobile device 301.

An optional fuel-cell power capacity algorithm 537 evaluates an extent of continuous operation available from a fuel cell power system for aircraft that are optionally equipped with a fuel cell power system (not shown). For example, for a fuel cell power system having a source of stored hydrogen, algorithm 537 evaluates hydrogen availability by considering parameters such as storage pressure, stored gas temperature, and gas usage rate, to determine available energy for unattended ground operations.

Figure 6:
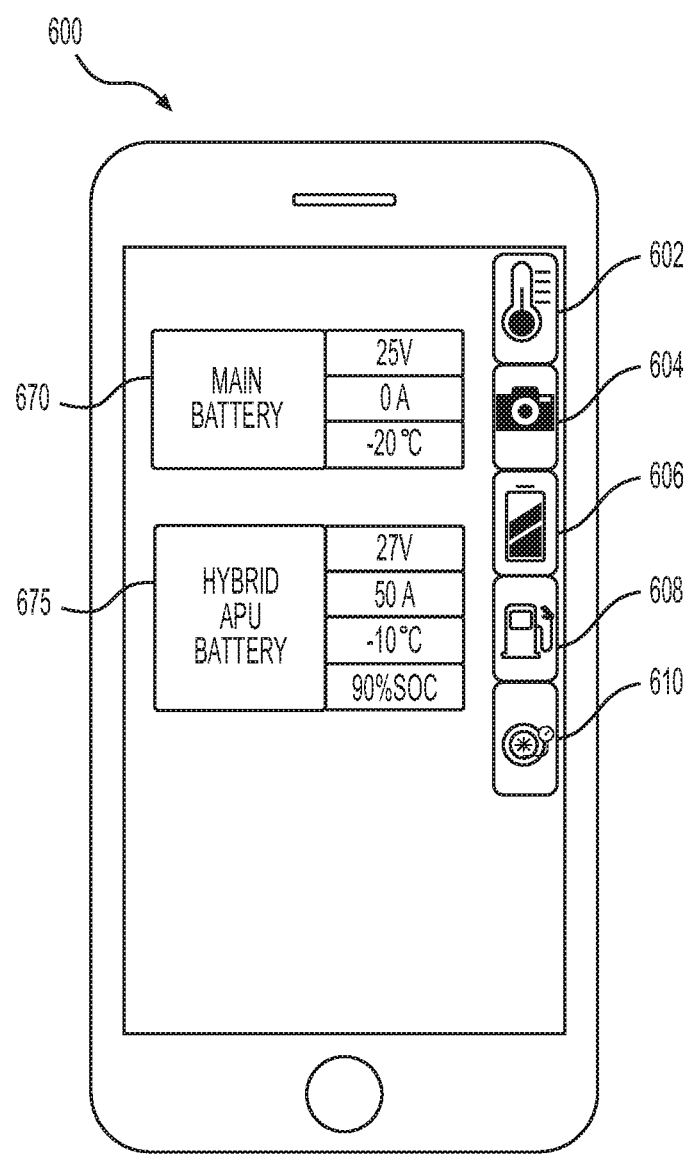
FIG. 6 shows a battery status page of a mobile device of FIG. 4, in an embodiment.

FIG. 6 shows battery status page 600 of a software application 3 for use on mobile device 301, FIG. 4. As used in this application, the term "page" should be considered to include a particular configuration of displayed icons and information. A plurality of high-level buttons 602-610 provide access to other pages of software application 3 in addition to battery status page 600, which may be accessed from any page of software application 3 via battery button 606. As used in this application, the term "buttons" should be considered to include any device for providing input by the user. Example buttons include interactive icons or indicators displayed on a touch-screen that are touchable, icons/indicators displayed on a computer screen that are clickable (e.g., with a mouse), or actual physical buttons or switches. For mobile device 301 having a touch-screen, buttons are configured to receive input when touched by a user and provide access to additional information and/or options, which may be in the form of additional pages. Buttons, icons, and indicators may be continuously displayed as a user navigates between a plurality of pages (e.g., buttons 602-610), whereas other buttons, icons, and indicators may be specific to a particular page (e.g., indicators 670 and 675, described below, are specific for battery status page 600).

Other pages provided by software application 3 may include pages for temperature control via a temperature button 602, security and surveillance via an security button 604, battery status via battery level button 606, fuel status via a fuel button 608, and tire pressure information via a tire pressure button 610. Buttons 602-610 may include icons for rapid identification including a thermometer icon for temperature button 602, a camera icon for the surveillance and security button 604, a battery-level indicator for battery level button 606, a fuel-pump icon for fuel button 608, and a tire and cross-section icon for tire pressure button 610.

Battery status page 600 includes a main battery indicator 670 configured to display status information for main battery module 103, FIG. 4, including for example, battery voltage (e.g., 25 Volts (V)), current (e.g., 0 Amps (A)), and temperature (e.g., −20° C.). A hybrid-APU battery indicator 675 displays status information for one or more battery modules 110 of hybrid APU 2, FIG. 4, including for example, voltage (e.g., 27 V), current (e.g., 50 A), temperature (e.g., −10° C.), and SOC (e.g., 90%). Battery indicators 670, 675 may be color-coded to provide an overall readiness indication. For example, main battery indicator 670 may be highlighted with red borders to indicate that the battery temperature is too low, whereas hybrid-APU battery indicator 675 may be highlighted with green borders to indicate that hybrid APU 2 is ready for use.

Figure 7:
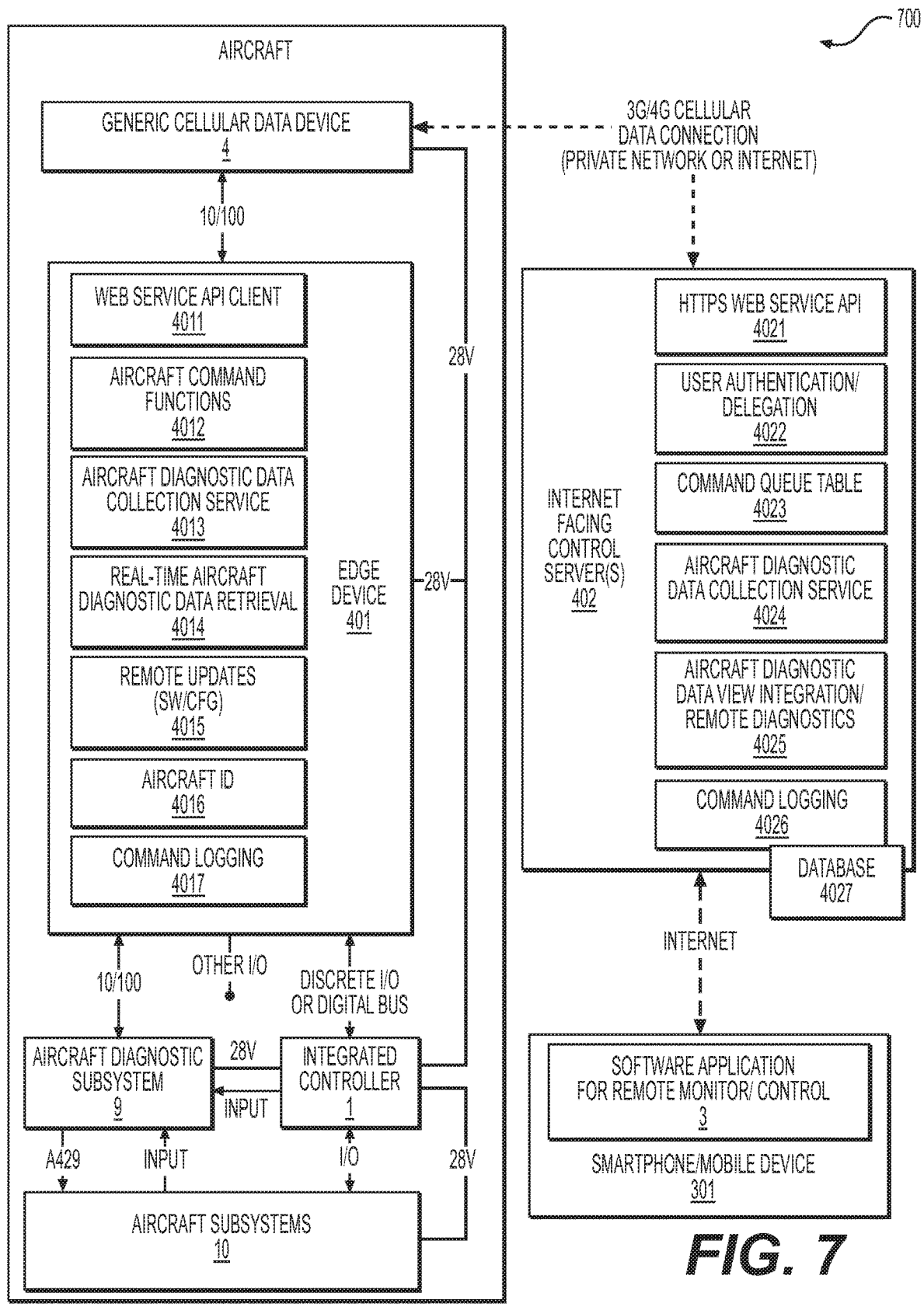
FIG. 7 is a block diagram showing a communication subsystem for communicative coupling between a mobile device and the integrated controller of FIG. 5, in an embodiment.

FIG. 7 is a block diagram showing a communication subsystem 700 for communicative coupling between mobile device 301 and aircraft subsystems 10 via control server 402, generic cellular data device 4, Gateway device, and integrated controller 1. Communicative coupling may be by one of a wired and/or wireless communication device. Aircraft subsystems 10 include main battery 102, hybrid APU 2, seat/yoke heater controller 5, ECS controller 6, security and surveillance controller 7, and electrical bus controller 8, for example.

Internet facing control server 402 may be located remotely (e.g., not at the airport and not with mobile device 301). Internet transmission may use any combination of cellular, satellite, wireless fidelity (Wi-Fi), Ethernet, or similar communication networks. A secure web service application program interface (API) 4021 handles communication over the Internet. In certain embodiments, the web service interface on control server 402 may implement standardized protocols such as Advanced Message Queuing Protocol (AMQP) or Message Queuing Telemetry Transport (MQTT). For example, when a command is sent from mobile device 301, the command is routed through internet-facing control server 402 via web service API 4021. A user of mobile device 301 may be authenticated via a user authentication/delegation protocol 4022. The 4022 protocol may make use of standard authentication and authorization methods such as SSL/TLS, OAuth, LDAP, or Active Directory. Once the user is authenticated, the command sent from mobile device 301 is added to a command queue table 4023, which is sent to the aircraft via generic cellular data device 4 to Gateway device. The main function of generic cellular data device 4 is to transmit and receive data to/from Gateway device through an Ethernet or similar data bus. Control server 402 may also implement a database 4027 to store transactional history for the various data to and from the aircraft. Control server 402 stores data from aircraft subsystems 10, including in an aircraft diagnostic data collection service 4024 for collecting subsystem data, an aircraft diagnostic data view integration 4025 for providing data to mobile device 301 in a viewable format, and command logging function 4026 for providing a log of entered commands.

Gateway device 401 is a device that serves as an intermediary between integrated controller 1 and the generic cellular data device 4 and provides unified access to aircraft subsystems for all external query and command operations. In certain embodiments, gateway device 401 is a router or integrated access device (IAD) that contains a plurality of input/output interfaces in order to interface with the integrated controller 1, diagnostic subsystem 9, or other aircraft systems 10. In some embodiments, gateway device 401 includes a web service API client 4011 for handling Internet communication. Gateway device 401 provides operations that may be performed by the mobile device 301 via relay through control server 402. Gateway device 401 may automatically and periodically attempt to establish a connection to control server 402 in order to receive commands or transmit system status. Gateway device 401 may utilize API client 4011 in order to establish a secure data communication path to control server 402. An aircraft command function 4012 determines whether a command is a data query or a command to activate/deactivate a specific function of aircraft subsystems 10. If the command is a data query it gets relayed to an aircraft diagnostic subsystem 9; otherwise, the command gets relayed to integrated controller 1. Following execution of an activation/deactivation command, integrated controller 1 returns a confirmation to mobile device 301 by way of traversing gateway device 401 and control server 402 via an Internet connection. Data query results are returned to control server 402 through the same path and made available for display on mobile device 301.

An aircraft diagnostic data collection service 4013 regularly collects and stores information from sensors monitoring subsystems throughout the aircraft. A real-time aircraft diagnostic data retrieval service 4014 may retrieve real-time data from data collection service 4013 upon request. A remote updates function 4015 provides automatic software updates of the latest software configuration. An aircraft ID 4016 provides identification information for the aircraft such as tail number or aircraft make, model, and serial number. A command logging function 4017 provides a log of entered commands.

Aircraft diagnostic subsystem 9, which is communicatively coupled to Gateway device and aircraft subsystems 10, collects data reported by aircraft subsystems 10. Example sensors include tire pressure sensors, engine oil level indicators, battery SOC sensors, and temperature sensing devices such as thermocouples and resistance temperature detectors. In an embodiment, aircraft diagnostic subsystem 9 sends interrogation requests for specific data parameters to a specified aircraft subsystem on demand. In an alternative embodiment, aircraft diagnostic subsystem 9 sends interrogation requests for specific data parameters to all sub-systems in real-time or on demand. In yet another embodiment, aircraft diagnostic subsystem 9 does not send interrogation requests but may receive any data sent to it.

In operation, flight crew may begin preflight preparation by remotely scheduling aircraft subsystems (e.g., using mobile device 301) to be activated and ready by a specific clock time, without requiring cockpit presets onboard the aircraft. For example, ECS controller 6 may be turned on for cockpit/cabin precooling, seat heaters 502, 504 may be turned on for preheating seats, and battery heaters may be turned on for heating battery modules 110 using mobile device 301, FIG. 3. Preflight operations may be powered using either an unlimited power source (e.g., a ground power cart plugged into the aircraft or a fuel-cell power system operating on aircraft jet fuel) or a limited power source (e.g., one or more main batteries, an extended capacity auxiliary battery such as hybrid APU 2, or a fuel cell power system operating on hydrogen stored in the aircraft).

After the aircraft has landed and been shut down, an unattended ground operations mode ensues. Battery modules 110 remain active to maintain integrated controller 1, Gateway device, and generic cellular data device 4 powered. These devices may be continuously active in a normal-power mode, continuously active in a low-power mode, or intermittently active to reduce energy usage and occasionally determine if normal-power mode should be resumed. Power modes may be varied depending on the state-of-charge of battery modules 110.

Figure 8:
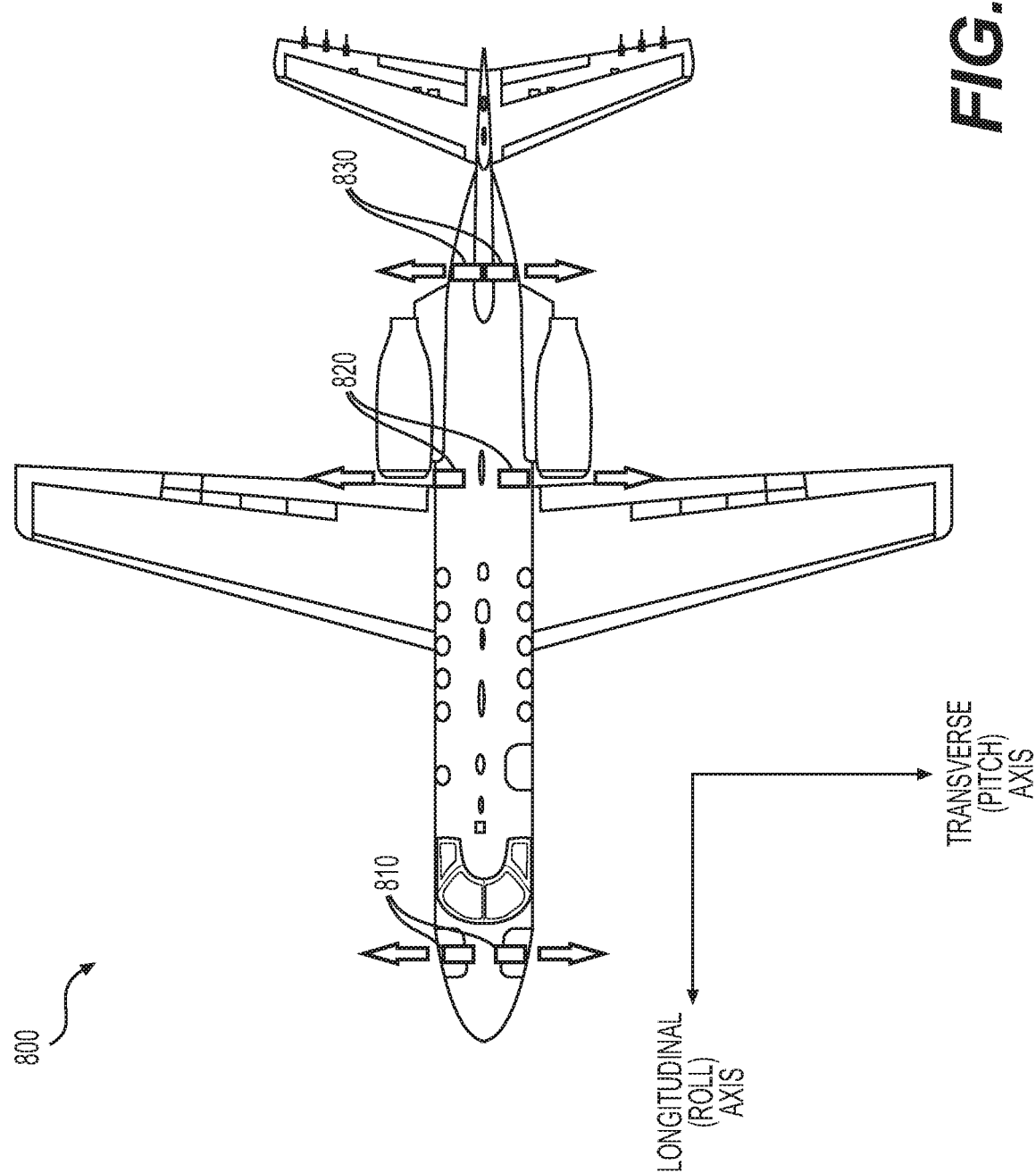
FIG. 8 shows a top-down aircraft view indicating exemplary rack locations, in an embodiment.

FIG. 8 shows a top-down aircraft view 800 indicating exemplary locations for rack 120, FIG. 1. FIGS. 8-10 are best viewed together with the following description. Exemplary locations for rack 120 include a nose location 810, an under-cabin fairing location 820, and a tailcone 830 along a longitudinal axis (i.e., the roll axis). In certain embodiments, one or more of locations 810, 820, and 830 may include a pair of racks 120 positioned opposite one another along a transverse axis (i.e., the pitch axis) of the aircraft, as depicted in FIG. 8, such that a pair of battery modules 110 may be mounted in a forward position for balancing an aft-heavy aircraft, or in an aft location for balancing a nose-heavy aircraft, without affecting center-of-gravity (CG) along the transverse (pitch) axis. In other words, a pair of battery modules 110 balance each other when installed in an opposing pair of racks 120 positioned opposite one another along the transverse axis. In other embodiments, only a single rack 120 may be located at one or more of locations 810, 820, and 830. The single rack locations may be centered over the longitudinal (roll) axis to prevent affecting CG along the transverse (pitch) axis.

Figure 9:
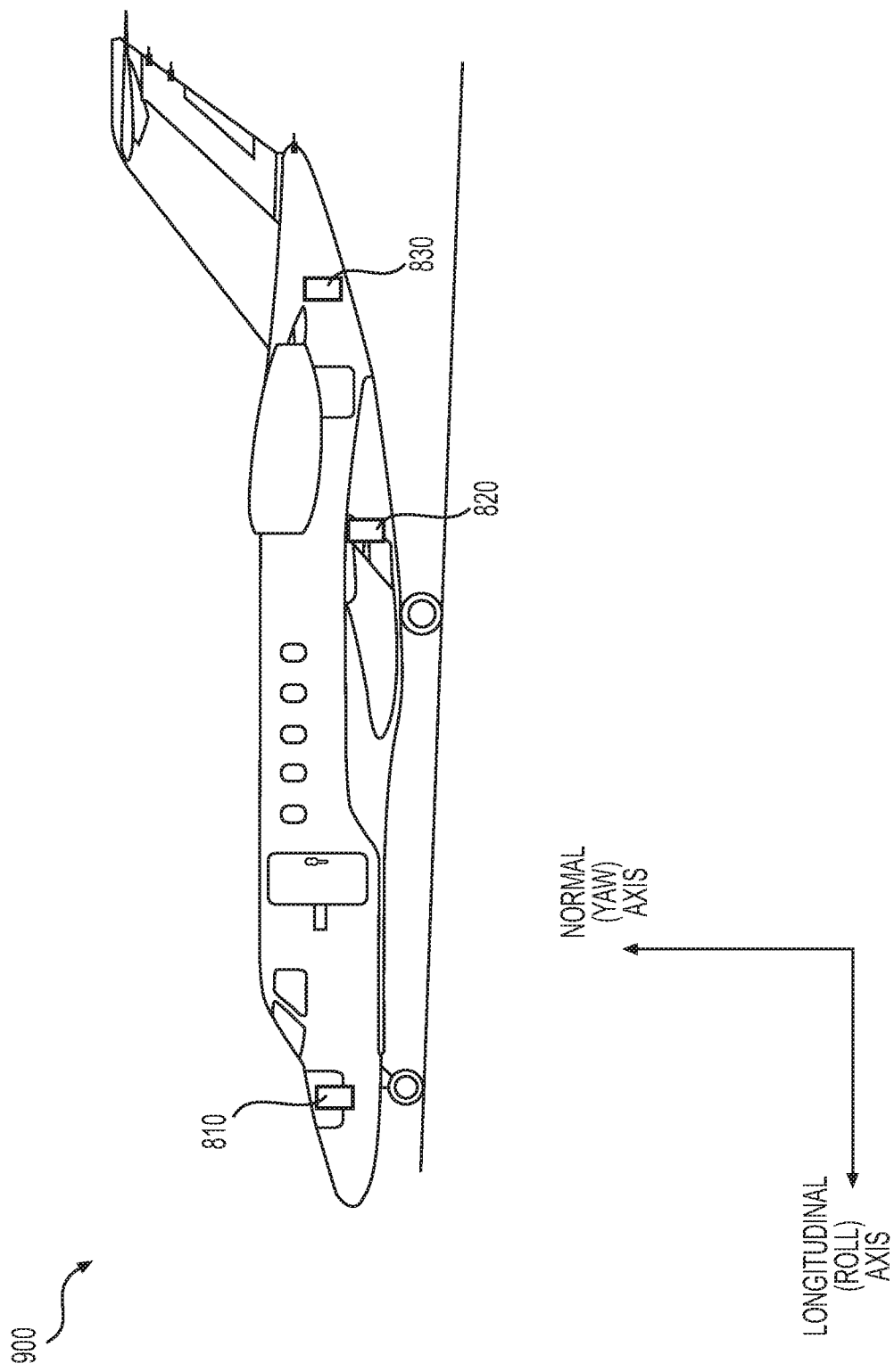
FIG. 9 shows a side aircraft view indicating exemplary rack locations, in an embodiment.

FIG. 9 shows a side aircraft view 900 indicating exemplary locations for rack 120, FIG. 1, including nose 810, under-cabin fairing 820, and tailcone 830, which may be positioned at different heights along a normal axis (i.e., the yaw axis).

Figure 10:
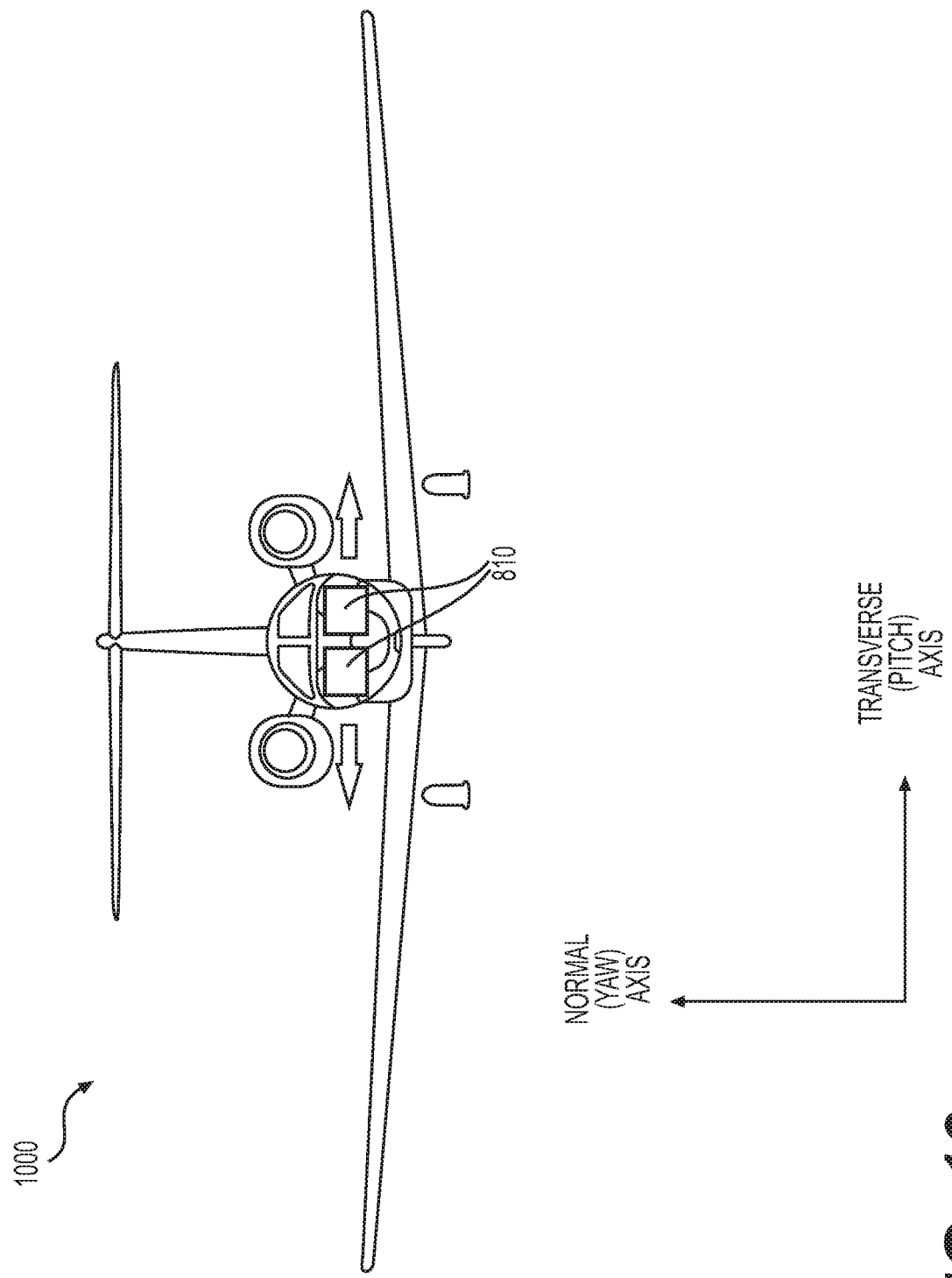
FIG. 10 shows a front aircraft view indicating exemplary rack locations, in an embodiment.

FIG. 10 shows a front aircraft view 1000 indicating port and starboard nose 810 locations for rack 120, FIG. 1. In certain embodiments, nose location 810 is a single location centered over the longitudinal (roll) axis. Other flight crew accessible portions of the aircraft may be used without departing from the scope hereof.

With a plurality of rack 120 locations available for mounting battery module 110, which locations are used may depend on auxiliary power and CG requirements for a specific mission. For example, only one module 110 may be used during the winter for seat pre-heating, whereas more than one module 110 may be used in the summer for cockpit/cabin precooling. To help balance CG, modules 110 may be mounted in nose 810 location for a tail-heavy CG configuration, or in tailcone 830 location for a nose-heavy CG configuration. Battery modules 110 may be electrically connected in parallel despite being mounted in various locations.

Having a plurality of rack 120 locations provides versatility that enables improved mission capability and reduced waste. For example, battery modules 110 may be unmounted to remove excess battery capacity for specific missions or during certain weather seasons, which reduces extra weight and therefore fuel waste, and increases the payload availability of the aircraft. By relocating battery modules 110, CG requirements may be met without adding ballast, which also reduces fuel waste from flying with extra weight.

If only one battery module 110 is mounted in one of a plurality of racks 120, charging or discharging of this battery module 100 ceases when unmounted and any existing current in the electrical bus junction box 802, FIG. 4 is rerouted to main battery 102, which may or may not be hot-swappable. If one of a plurality of battery modules 110 is unmounted, the remaining mounted battery modules 110 may pick up the resulting excess charge/discharge under control of integrated controller 1. If none of battery modules 110 are mounted within a specified time period, integrated controller 1 may shut down remaining loads to preserve charge of main battery 102.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. A distributed auxiliary-power-unit (APU) system for an aircraft, comprising:
   one or more battery modules for storing electrical power, wherein each of the one or more battery modules further includes a bi-stable relay that is capable of remaining in a predetermined position even when the bi-stable relay is unpowered; and
   a plurality of connectors distributed throughout the aircraft for receiving the one or more battery modules to electrically connect with an electrical subsystem of the aircraft, wherein a number of battery modules installed is based on an amount of electrical power planned for a given flight of the aircraft.

2. The APU of claim 1, wherein each battery module is configured for hot-swap capability with a respective one of the plurality of connectors.

3. The APU of claim 1, wherein the plurality of connectors are each respectively located in a plurality of locations dispersed throughout the aircraft, such that the one or more battery modules are installed in one or more of the plurality of locations in a configuration selected for balancing the center-of-gravity (CG) of the aircraft.

4. The APU of claim 3, wherein the plurality of locations along a longitudinal axis of the aircraft are selected from the group consisting of a nose location, a tailcone location, and an under-cabin fairing location between the nose location and the tailcone location.

5. The APU of claim 3, wherein the plurality of locations comprise opposing pairs of connectors positioned along the transverse axis of the aircraft, such that installing a first battery module on a port side of the aircraft and a second battery module on a starboard side of the aircraft, opposite the first battery module, prevents altering the CG of the aircraft along the transverse axis.

6. The APU of claim 5, wherein the pair of battery modules installed in the opposing pair of connectors are located in a forward position when balancing the CG of an aft-heavy aircraft and in an aft location when balancing the CG of a nose-heavy aircraft.

7. The APU of claim 1, wherein a plurality of battery modules are electrically arranged in parallel when installed in the plurality of locations dispersed throughout the aircraft.

8. A distributed auxiliary-power-unit (APU) system for an aircraft, comprising:
   one or more battery modules for storing electrical power;
   a plurality of connectors distributed throughout the aircraft for receiving the one or more battery modules to electrically connect with an electrical subsystem of the aircraft, wherein a number of battery modules installed is based on an amount of electrical power planned for a given flight of the aircraft; and
   the plurality of locations comprises locations at more than one height along a normal axis of the aircraft to enable balancing a center-of-gravity (CG) of the aircraft along the normal axis based on a distribution of battery modules installed in the plurality of locations.

9. A distributed auxiliary-power-unit (APU) system for an aircraft, comprising:

one or more battery modules for storing electrical power;
a plurality of connectors distributed throughout the aircraft for receiving the one or more battery modules to electrically connect with an electrical subsystem of the aircraft, wherein a number of battery modules installed is based on an amount of electrical power planned for a given flight of the aircraft; and
each of the one or more battery modules is housed in an enclosure selected from the group consisting of a vented enclosure and a fire-retardant enclosure.

10. An auxiliary power system for an aircraft, comprising:
a plurality of battery modules electrically coupled with an electrical subsystem of the aircraft;
a connector for electrically connecting a first battery module from the plurality of battery modules into the auxiliary power system,
wherein the connector is adapted for hot-swapping such that a second battery module may be used to replace the first battery module via the connector without shutting down the electrical subsystem or powering down the first battery module prior to uninstalling;
a plurality of long pins within the connector configured to electrically connect with a respective plurality of long sockets;
a plurality of short pins within the connector, shorter than the long pins, configured to electrically connect with a respective plurality of short sockets; and
a bi-stable relay configured to maintain a position when unpowered, wherein:
upon connecting, the long pins electrically connect with the respective long sockets to send a signal command to the internal bi-stable relay to close prior to the short pins electrically connecting with the respective short sockets; and
upon disconnecting, the short pins electrically disconnect from the respective short sockets to command the internal bi-stable relay to open prior to the long pins electrically disconnecting from the respective long sockets.

11. The auxiliary power system of claim 10, further comprising:
a plurality of connectors electrically coupled with the electrical subsystem of the aircraft;
the plurality of connectors being adapted to receive a respective one of the plurality of battery modules such that a number of battery modules installed in the plurality of connectors is based on an amount of electrical power planned for a particular flight of the aircraft; and
the electrical subsystem is adapted for the plurality of battery modules to function as a single cohesive battery.

12. The auxiliary power system of claim 11, wherein the plurality of battery modules are electrically arranged in series.

13. The auxiliary power system of claim 11, wherein the plurality of battery modules are electrically arranged in parallel.

14. The auxiliary power system of claim 11, wherein the plurality of battery modules may be installed and uninstalled with the plurality of connectors without the use of tools and without the need for a mechanic or maintenance down-time.

15. A remote monitoring system for a distributed auxiliary-power-unit (APU), comprising:
one or more battery modules electrically and communicatively coupled with an integrated controller;
a plurality of hot-swappable racks each adapted to receive one of the one or more battery modules for electrically and communicatively coupling with the integrated controller; and
a remote interface communicatively coupled with the integrated controller for receiving user-input to direct electrical power from the one or more battery modules to one or more subsystems.

16. The remote monitoring system of claim 15, wherein the remote interface is a mobile device.

17. The remote monitoring system of claim 16, wherein the mobile device displays data selected from the group consisting of a voltage, a current, a temperature and a state-of-charge for each of the one or more battery modules.

18. The remote monitoring system of claim 17, wherein the plurality of hot-swappable racks are located onboard an aircraft and the mobile device enables initiation of preflight preparations for the aircraft by providing electrical power from the one or more battery modules installed in the hot-swappable racks to one or more aircraft subsystems.

19. The remote monitoring system of claim 18, wherein the plurality of hot-swappable racks are dispersed throughout the aircraft for enabling installation of the one or more battery modules for balancing a center-of-gravity (CG) of the aircraft.

* * * * *